United States Patent [19]

Higgins

[11] 4,117,171

[45] * Sep. 26, 1978

[54] COLLAGEN COMPOSITIONS AND THE METHOD OF PREPARING THE SAME

[75] Inventor: Thomas Engel Higgins, Brookfield, Ill.

[73] Assignee: Union Carbide Corporation, New York, N.Y.

[ * ] Notice: The portion of the term of this patent subsequent to Dec. 6, 1994, has been disclaimed.

[21] Appl. No.: 732,482

[22] Filed: Oct. 14, 1976

[51] Int. Cl.² ............................................. A22C 13/00
[52] U.S. Cl. .................... 426/140; 426/278; 426/646; 426/652
[58] Field of Search ............... 426/138, 140, 278, 277, 426/646, 652

[56] References Cited

U.S. PATENT DOCUMENTS

| | | |
|---|---|---|
| 3,782,977 | 1/1974 | Henderson et al. ................. 426/140 |
| 3,928,653 | 12/1975 | Dowell, Jr. et al. ............ 426/140 X |
| 3,956,512 | 5/1976 | Higgins ................................ 426/140 |

*Primary Examiner*—Raymond N. Jones
*Assistant Examiner*—R. A. Yoncoskie
*Attorney, Agent, or Firm*—David Fink

[57] ABSTRACT

A homogeneous formable aqueous collagen composition having uniformly incorporated therein at least about 5% by weight based on the solids content thereof of an antiblock additive selected from the group consisting of fully esterified fatty acid esters of polyhydric alcohols, mineral oil, and mixtures of the same, said collagen composition being formable into shaped collagen structures that exhibit improved antiblocking characteristics.

19 Claims, No Drawings

COLLAGEN COMPOSITIONS AND THE METHOD OF PREPARING THE SAME

The present invention relates to improved collagen compositions and more particularly it relates to edible collagen compositions especially useful as tubular food casings and to the method of making the same.

In the manufacture of tubular food casings from materials such as collagen, problems have been encountered due to the delicate, fragile, and tacky nature of the materials. For example, in one well known method of preparing a continuous length of tubular collagenous material, extruded collagen tubing is inflated with air and partially dried to impart a degree of strength that will enable it to withstand further processing, then collapsed into a flattened, two-ply strand and conveyed through a series of liquid treatment baths. Flattening the tubing serves to prevent "roping" of the tubular material and/or entrapment of air while advancing through the liquid treatment baths.

Reinflating the flattened tubing advancing from the liquid treatment baths is then generally necessary for subsequent treatment, such as drying and sizing. Moreover, tubular collagen products such as food casings are in general, subsequently shirred and compressed to obtain short lengths thereof, commonly called shirred casing sticks. While the shirring operation may be carried out immediately following the drying and sizing operation, dried flattened casings are often stored on reels and then fed separately to shirring machines.

As is known by those skilled in the art, reinflation of the flattened tubing into a tubular configuration is typically accomplished by injecting a stream of air under pressure into the collagen tubing. When reinflating a delicate and fragile tubular material such as that made from collagen, the use of excessive air pressures can burst or seriously weaken the tubing wall, or can adversely affect the elongation or stretch characteristics thereof. Accordingly, relatively low internal pressure is preferably used to inflate and retain tubular collagen in a tubular configuration. However, because of the tendency of tubular collagen to block, the inner wall surfaces of the flattened tubing adhere to each other making reinflation of the tubing without damage thereto quite difficult. Methods and apparatus for overcomig the problem are disclosed, for example, in U.S. Pat. No. 3,619,442 to Henderson, but elimination of the blocking tendencies of collagen tubing would clearly be a desirable improvement.

Heretofore, it has been suggested, as, for example, disclosed in U.S. Pat. Nos. 2,114,220 to Freudenberg et al, 3,446,633 to Talty, 3,551,535 to Henderson et al and 3,627,542 to Cohly et al, and also shown in copending U.S. Application Ser. No. 666,612, filed Mar. 15, 1976, that a number of different materials may be incorporated in collagen compositions during their preparation or used to treat shaped collagen structures during the processing thereof to improve or modify the properties of the shaped collagen products. Moreover, in the U.S. Pat. No. 3,956,512 to Higgins there is disclosed that the incorporation of certain fatty acid partial esters and acetylated fatty acid partial esters in collagen compositions serves to improve or eliminate blocking characteristics of formed or shaped collagen structures. However, further means of improving or eliminating the blocking tendencies of collagen tubing would be desirable.

In accordance with the present invention, there is provided a method for preparing improved collagen compositions which comprises uniformly incorporating into a formable collagen composition an antiblock additive selected from the group consisting of fully esterified fatty acid esters of polyhydric alcohols, mineral oil, and mixtures of the same in an amount of at least about 5% by weight of the solids content of said collagen composition. It has been discovered that the use of such improved collagen compositions, surprisingly and unexpectedly, results in shaped collagen structures such as, for example, a tubular collagen food casing, having improved antiblocking characteristics.

There is also provided in accordance with the invention, a formable, homogeneous collagen composition comprising at least about 5% by weight of the total solids thereof of an antiblock additive uniformly dispersed therein, said antiblock additive being selected from the group consisting of fully esterified fatty acid esters of polyhydric alcohols, mineral oil, and mixtures of the same. Preferably collagen compositions of the invention comprise at least about 6% by weight of collagen solids and from about 5% to about 30% by weight of the dry solids content of said composition of non-collagenous fibers.

Reference to the terms "total solids", "solids content" and "dry solids content" as used throughout this specification and in the appended claims with respect to the collagen compositions and casings of the invention is intended to refer to, and should be understood as referring to the weight of all ingredients in such compositions and casings excluding water and glycerol.

To obtain the collagen compositions of the present invention, the antiblock additive is added to and uniformly dispersed in the collagen compositions prior to forming therefrom desired shaped structures, such as tubular food casings. The antiblock additive may be added directly to the collagen composition if in liquid form, or in the form of an aqueous emulsion. In this manner, the antiblock additive is incorporated and uniformly dispersed in the wall of the shaped collagen structure and affords improved antiblocking characteristics thereto during the entire processing sequence thereof without interfering with or adversely affecting the processing sequence employed.

Collagen tissues prepared by methods well known in the art from a variety of raw materials as, for example, limed and unlimed animal hide splits and tendon may be used in the preparation of the collagen compositions of the invention.

Antiblock additives that are suitable for use in accordance with the present invention are fully esterified fatty acid esters of polyhydric alcohols, mineral oil, and mixtures of the same.

The term "fatty acid" as used herein is definitive of a group of aliphatic carboxylic acids that have widespread occurrence in natural fats, oils and allied substances. Such acids generally contain from 8 to 22 carbon atoms and may be saturated or unsaturated. The polyhydric alcohols used in forming the esters are alcohols containing at least 3 carbon atoms such as diethylene glycol, propylene glycol, glycerol, sorbitol, mannitol and the like.

Suitable fatty acid esters that may be used as antiblock additives in the invention are fully esterified esters wherein one or more fatty acids are esterified with a polyhydric alcohol such as the triglycerides found in vegetable and animal fats and oils. Exemplary of the suitable vegetable and animal fats and oils are castor oil, corn oil, cottenseed oil, soybean oil, safflower oil and the like, and lard.

Also suitable as an antiblock additive is mineral oil that is derived from petroleum which must be of food grade or acceptable for food applications.

In a preferred embodiment of the invention, collagen-containing tissue, as, for example, limed animal hide splits, cleaned and prepared by methods well known in the art, are diced or coarsely chopped into pieces about ⅛ inch to 2 inches in size to facilitate transfer and agitation. After an additional treatment with lime and subsequent water wash, the hide pieces are subjected to treatment with a collagen swelling agent. Any of the known collagen swelling agents may be employed, but it is preferred to use dilute lactic, acetic or hydrochloric acid solutions. Collagen pieces are treated with swelling agent for an extended period of time, such as, for example, 4 to 9 hours or even longer, and, generally, until the character of the collagen material has completely changed from opaque to translucent. The swollen collagenous material is then washed with water to reduce the amount of residual acid and, generally, until the pH of the comminuted swollen collagen ranges between about 2.5 – 3.5. The swollen collagen is then drained, leaving pieces generally referred to as "acid-swollen chips".

As disclosed in U.S. Pat. No. 3,782,977 to Henderson et al, non-collagenous fibers that are to be incorporated into the collagen composition are first formed into a viscous aqueous fibrous dispersion that may contain between about 2% and 10% by weight of the non-collagenous fibers and between about 0.1% and 10% by weight of a viscosity control agent that is preferably water soluble or water dispersible. Suitable viscosity control agents include, for example, methyl cellulose, gelatin, starch, and particularly, a dispersion of swollen collagen particles. Non-collagenous fibers that may be employed are any of the non-shrinking and essentially inert fibrous additives known to be suitable in collagen compositions such as, for example, wood, cotton, rayon, other cellulosic fibers, non-cellulosic fibers such as polyester, polyamide and the like.

Acid-swollen chips to be used in the preparation of the formable collagen composition are, preferably, further comminuted prior to mixing with the aqueous fibrous dispersion. The acid-swollen chips may be partially subdivided by means known in the art, such as by coarse grinding or crushing, to prepare a mass containing a predominance of chunks having major dimensions of about ⅛ inch to ½ inch.

The antiblock agent of the invention, water as water or ice, and a portion of the ground acid-swollen chips are added to and thoroughly mixed with the viscous fibrous dispersion in a suitable dough mixer or other similar mixing equipment, and then the remainder of the ground acid-swollen chips are admixed therewith, whereby the antiblock agent and fibrous additive components are uniformly distributed throughout the collagen mass in a relatively short time, as, for example, between about 2 and 10 minutes. Towards the end of the mixing step, the collagen mass becomes much more viscous which helps in preventing separation of the various components during forming and subsequent processing thereof.

It is important that the temperature of the collagen mass be kept low during grinding and mixing of the "acid-swollen chips", and the temperature of the mass is, in general, maintained below abot 25° C.

The collagen composition that is prepared has uniformly incorporated therein the antiblock additive of the invention in the amount of at least about 5% by weight, and preferably between about 10% and about 25% by weight, of the solids content to the collagen composition. In accordance with the present invention, the quantity of antiblock additive needed to impart the desired improved antiblocking characteristics is important, and at least 5% by weight of antiblock additive based on the total solids of the collagen composition should be used. However, the amount of the antiblock additive used may be varied over a relatively wide range, and the upper limit thereof that may be used is not generally critical and may be substantially in excess of that actually required. In general, however, amounts of antiblock additive greater than about 30% by weight of total solids in the collagen composition may detrimentally affect some physical properties of the collagen structures prepared therefrom and should, therefore, be avoided. Preferably, the collagen composition that is prepared comprises at least about 6% by weight of collagen solids and has uniformly incorporated therein between about 5% and 30% by weight of non-collagenous fibers based on the weight of total solids.

In alternative embodiments of the invention the antiblock additive, may be added to the fibrous dispersion mixture before mixing the same with the ground acid swollen chips or may be added to a swollen low solids collagen slurry prepared in accordance with any of the methods known in the art before or after adding other ingredients thereto.

The uniform preferably high collagen solids composition so prepared is suitable, with only limited further processing, for forming into commercially acceptable formed or extruded collagen structures. A screw extruder or similar device can be used to transfer the collagen composition to homogenization equipment used in final preparation of the composition for extrusion.

Exemplary of a preferred method of preparing a tubular collagen structure such as, for example, a tubular food casing is the pumping and metering of a collagen composition of the invention through an extrusion nozzle to form a continuous tube of collagen, which tube is strong enough to support itself in a tubular configuration with a low pressure inflation air while being conveyed to and through a predryer. The partially dried collagen tubing is then collapsed between nip rolls, neutralized by passing through a dip tank containing very dilute ammonium hydroxide, washed by passing through water tanks, and then plasticized by being conveyed through a dilute glycerine solution. The tubing is then readily reinflated with low pressure air, conveyed through a dryer while maintaining the tubular configuration, and then if desired, shirred into a shirred casing stick by passing through a shirring apparatus.

Collagen tubing prepared from collagen compositions of the invention in the manner herein described perform satisfactorily through each of the various processing steps with no problems in reinflating the tubing being encountered due to "blocking" of the tubular collagen material. Moreover, it has been found that tubular collagen casings prepared in accordance with the practice of the invention, in addition to exhibiting substantially no blocking problems, perform satisfactorily during stuffing and linking operations and during cooking.

Tubular collagen food casings of the present invention having the antiblock additive herein described uniformly incorporated therein in an amount from about 3% to about 19% by weight, and preferably between about 6% and 15% by weight, of all components including water and glycerol of said casing, exhibit substantially improved antiblocking characteristics and, in general, exhibited satisfactory performance during stuffing operations and cooking. Especially preferred are tubular collagen food casings having uniformly incorporated therein from about 3% to about 19% by weight of non-collagenous fibers based on the weight of all components including water and glycerol of said casings.

The following examples are set forth as illustrating embodiments of the present invention and are not intended in any way to indicate the limits of the invention. Parts and percentages, unless otherwise indicated, are by weight.

EXAMPLE I 1457 pounds of limed beef hide splits were chopped into approximately ⅛ inch to 2 inch pieces and subjected to an additional lime treatment by charging into a tank together with 102 lbs. of lime and sufficient water to give a water to hide ratio of 4.5 to 1. The lime treatment was continued for 92 hours with intermittent agitation after which the limed hide chips were leached with approximately 14 gals./min. of water for 23 hours. The hide chips were then swollen for 9 hours in a hydrochloric acid solution maintained at a pH of 1 using a flow rate of dilute acid of 10 gals./min. At the end of the acid swell treatment, the swollen chips were washed with water at 30 gals./min. for about 1.2 hours until a wash water pH of 2.6 was reached. The chips were allowed to equilibrate for about 16 hours in the weak acid solution, then drained and chilled to about 1° C.

A cellulose fiber dispersion was prepared using the following proportion of ingredients:
Ground acid-swollen chips; 275 lbs.
Wood cellulose fibers; 176 lbs.
Water; 2507 lbs.

The wood cellulose fibers used had an average fiber length of about 0.040 inch. Sheets of fibers were separated into convenient pieces, soaked in a portion of the water for about 60 minutes and then mixed for about two minutes, soaked for an additional 30 minutes, and then mixed for two minutes. The rest of the ingredients were added and the mixture was blended for about 100 minutes. The resulting wood cellulose fiber suspension was smooth, highly viscous, free of fiber clumps and had a composition of collagen solids 1%, wood cellulose fibers 5.6% and water 93.4%.

A series of collagen compositions of about 37 pounds having a total solids of 11.3% were prepared having the following proportions of ingredients:

| Collagen Composition | % of Composition Solids | | |
|---|---|---|---|
| | Collagen | Cellulose Fiber | Lard |
| A | 85 | 15 | 0 |
| B | 70 | 15 | 15 |
| C | 60 | 15 | 25 |

"Acid-swollen chips" prepared as described hereinabove were ground in a meat grinder into pieces substantially between about ⅛ inch to ½ inch in size prior to blending with the viscous cellulose fiber dispersion. The temperature during grinding of the chips was controlled so as not to exceed about 20° C. The lard was a soft, white semi solid triglyceride fat rendered from body fat of swine.

Blending of the "acid-swollen chips", cellulose fiber dispersion and antiblock additive was conducted as described below.

The ingredients were mixed in two steps. In the first step, the lard, water and a portion of the ground, "acid-swollen chips" were added to the cellulose fiber dispersion and then thoroughly mixed. In the second mixing step, the mixture was blended with the remainder of the ground "acid-swollen chips" and mixed for about five minutes at which time the composition was homogeneous and began to adhere to the mixing equipment. The temperature of the various materials during the two mixing steps was controlled so as not to exceed 20° C.

After preparing each of the collagen compositions, the composition was fed through a rotary-shear homogenizer by means of a screw extruder and pump. To prevent degradation of the collagen, the homogenizer rotor and stator were cooled with a coolant maintained at a temperature about −5° C.

After homogenization, the blend was pumped through two parallel filters with 0.003 inch slots to break up any remaining collagen lumps and remove any nondispersed matter.

Each of the filtered collagen blends was then pumped and metered through an extrusion nozzle to form a continuous tube of collagen. The extruded tube was inflated with low-pressure inflation air while being conveyed on horizontal rolls, and partially dried and hardened by passing through a predryer at 50° C. The inflated tubing was then collapsed between nip rolls, neutralized by passing through a dip tank containing 0.06 N ammonium hydroxide, washed by being conveyed through water tanks and plasticized by being conveyed through a dilute glycerine solution. The "gel strength" of samples of plasticized, flattened tubing was measured using a "Scott Tensile Tester" made by Scott Testers, Inc., Providence, Rhode Island. "Gel strength" is the force in pounds required to break the flattened tubing when stretched in the machine direction.

The tubing sample was then reinflated with low pressure air, dried in air at 100° C., moisturized in an equalizer at 70% RH, and shirred by passing through a shirring apparatus.

The tubing samples were reinflated in a suction box as described in U.S. Pat. No. 3,619,442. The suction box is a relatively airtight chamber through which the tubular collagen gel stock passes just before entering the dryer. In the suction box a small negative pressure is maintained, decreasing the pressure outside the tubing. Air under pressure, introduced at the shirring machine into the continuous length of tubing, acts, with the negative pressure in the suction box, to inflate the tubing in the suction box. The air pressure required to reinflate the flattened tubing is determined as the sum of the suction box negative pressure and the shirring machine inflation pressure. The minimum reinflation pressure is the minimum pressure required to maintain the collagen tubing in an inflated condition while it advances through the dryer and then through the shirring apparatus of the shirring machine. The minimum reinflation pressure was determined under operating conditions by adjusting the suction box negative pressure to the point where the collagen tubing just remained in an inflated state. The sum of the shirring machine inflation pressure and the suction box negative pressure under these conditions was the minimum reinflation pressure.

A summary of the tubing "gel strength" and results determined in reinflating the various samples of the Example is reported in Table 1, below.

TABLE 1

| Collagen Composition | Lard Content | | Reinflation Pressure (Inches of water) | | Gel Strength (lbs.) |
|---|---|---|---|---|---|
| | % of Composition Solids | % of Casing Wt. | As Measured | Decrease from Control | |
| A (Control) | 0 | 0 | 3.6 | 0 | 5.2 |
| B | 15 | 9 | 2.9 | 0.7 | 3.7 |
| C | 25 | 15 | 2.2 | 1.4 | 2.5 |

As shown in Table 1, lard, when employed in the proportions of the present invention, reduced the minimum reinflation pressure required for collagen tubing as compared to tubing containing no lard antiblock additive. The "gel strength" of collagen tubing having a lard content of 15% was sufficiently strong to permit processing thereof, but any further reduction of the tubing "get strength" would be generally unsatisfactory.

EXAMPLE II

Using the procedure of Example I, ground collagen acid-swollen chips are prepared from 1550 pounds of limed beef hide splits subjected to an additional lime treatment with 110 pounds of lime.

The procedure of Example I is also used in preparing a cellulose fiber dispersion with the following proportion of ingredients:
Ground Acid-Swollen Collagen Chips; 175 pounds
Wood Cellulose Fibers; 152 pounds
Water; 2220 pounds Four collagen compositions having the proportion of ingredients summarized in Table 2, below, are prepared to give a total solids content of 11.1%. The mixing procedure differs from that of Example I in that the mineral oil is mixed with the cellulose fiber dispersion and then further mixed with the ground acid-swollen chips and water.

TABLE 2

| Collagen Composition | Total Weight (lb.) | % of Solids | | Mineral Oil |
|---|---|---|---|---|
| | | Collagen | Cellulose | |
| A (Control) | 172 | 85 | 15 | 0 |
| B | 140 | 70 | 15 | 15 |
| C (Control) | 78 | 85 | 15 | 0 |
| D | 59 | 80 | 15 | 5 |

The mineral oil used in this example is a food grade mineral oil derived from petroleum.

Collagen tubing samples are prepared from each of the collagen compositions of the example using the procedure of Example 1. Tubing "gel strength" and reinflation pressure for each of the tubing samples are measured as described in Example 1 and are reported in Table 3.

As shown in Table 3, incorporation of mineral oil affords collagen tubing requiring a reduced minimum reinflation pressure. The gel strength of such tubing is great enough to permit the processing thereof.

EXAMPLE III

Using the procedure of Example I, ground acid-swollen chips are prepared from 1034 pounds of limed beef hide splits subjected to an additional treatment with 72 pounds of lime and used to prepare Collagen Composition "A" of this example.

TABLE 3

| Collagen Composition | Mineral Oil | | Minimum Reinflation Pressure (Inches of Water) | | Gel Strength (Lbs.) |
|---|---|---|---|---|---|
| | % of Composition Solids | % of Casing Weight | As Measured | Decrease from Control | |
| A | 0 | 0 | 2.5 | — | 3.4 |
| B | 15 | 9 | 2.0 | 0.5 | 3.3 |
| C | 0 | 0 | 2.7 | — | 3.2 |
| D | 5 | 3 | 2.5 | 0.2 | 3.5 |

Also using the procedure of Example I, ground acid-swollen chips are prepared from 1545 pounds of limed beef hide splits subjected to an additional lime treatment with 107 pounds of lime and used in preparing Collagen Composition "B" of this example.

The procedure of Example I is used in preparing a cellulose fiber dispersion with the following proportion of ingredients:
Extruded Collagen Dispersion; 200 pounds
Wood Cellulose Fibers; 109 pounds
Water; 1630 pounds Collagen Composition "A" having an 11.1% solids content with no added cottonseed oil antiblock additive is prepared by the procedure of Example I.

Collagen Composition "B" containing cottonseed oil antiblock additive is prepared using a three step mixing procedure. In the first step, the cottonseed oil, water, and a portion of the ground acid-swollen chips are mixed thoroughly. In the second step, cellulose fiber dispersion is added and thoroughly mixed. In the third step, the remainder of the ground acid-swollen chips are added and mixed until the composition is homogeneous.

The proportion of components of the collagen compositions of this example are as follows:

| Collagen Composition | Total Weight (lb) | % of Composition Solids | | |
|---|---|---|---|---|
| | | Collagen | Cellulose | Cottonseed Oil |
| A (Control) | 307 | 85 | 15 | 0 |
| B | 95 | 70 | 15 | 15 |

Refined cottonseed oil used in this Example is a light yellow triglyceride food grade oil extracted from cottonseed.

Collagen tubing samples are prepared from the collagen compositions of this example using the procedure described in Example I. The procedure described in Example I is used to determine tubing gel strength and to measure the reinflation pressure for each of the collagen tubing samples. Results determined for tubing gel strength and for reinflating the tubing samples of the Example are reported in Table 4.

TABLE 4

| Collagen Composition | Cottonseed Oil | | Minimum Reinflation Pressure (Inches of Water) | | Gel Strength (Lbs) |
|---|---|---|---|---|---|
| | % of Composition Solids | % of Casing Weight | As Measured | Decrease from Control | |
| A (Control) | 0 | 0 | 2.6 | — | 3.1 |
| B | 15 | 9 | 2.3 | 0.3 | 3.0 |

What is claimed is:

1. A method of preparing a formable collagen composition suitable for use in preparing a shaped collagen structure which exhibits improved antiblocking characteristics including the step of uniformly incorporating into a formable collagen composition an antiblock additive selected from the group consisting of fully esterified fatty acid esters of polyhydric alcohols, mineral oil, and mixtures of the same, in an amount of at least about 5% by weight of said additive based on the solids content of said collagen composition.

2. A method as claimed in claim 1 wherein said antiblock additive is incorporated in said collagen composition in an amount from about 10% to about 25% by weight of the solids content of said collagen composition.

3. A method as claimed in claim 1 wherein said formable collagen composition comprises at least about 6% by weight of collagen solids.

4. A method as claimed in claim 1 wherein said antiblock additive is a fully esterified fatty acid ester of a polyhydric alcohol.

5. A method as claimed in claim 1 wherein said antiblock additive is mineral oil.

6. A method of preparing a formable collagen composition suitable for use in preparing a shaped collagen structure which exhibits improved antiblocking characteristics including the steps of:
   (a) preparing a viscous aqueous dispersion of non-collagenous fibers;
   (b) preparing a comminuted pre-swollen collagen mass; and then
   (c) admixing an amount of said aqueous fiber dispersion and an antiblock additive selected from the group consisting of fully esterified esters of polyhydric alcohols, mineral oil, and mixtures of the same with said pre-swollen collagen mass so that at least about 5% by weight of said antiblock additive and at least about 5% by weight of said non-collagenous fibers based on the solids content of said collagen admixture is incorporated in the collagen composition and then thoroughly mixing until a uniform admixture is obtained.

7. A method as claimed in claim 6 wherein said antiblock additive is incorporated in said collagen composition in an amount from about 10% to about 25% by weight of the solids content of said collagen composition.

8. A method as claimed in claim 6 wherein said antiblock additive is a fully esterified fatty acid ester of a polyhydric alcohol.

9. A method as claimed in claim 6 wherein said antiblock additive is mineral oil.

10. A method as claimed in claim 6 wherein said collagen composition contains at least about 6% by weight of collagen solids.

11. A homogeneous formable aqueous collagen composition having uniformly incorporated therein at least about 5% by weight based on the solids content thereof of an antiblock additive, said antiblock additive being selected from the group consisting of fully esterified fatty acid esters of polyhydric alcohols, mineral oil and mixtures of the same.

12. The collagen composition of claim 11 wherein said collagen composition contains from about 10% to about 25% by weight of the dry solids content thereof of said antiblock additive.

13. The collagen composition of claim 11 wherein said collagen composition comprises at least about 6% by weight of collagen solids.

14. The collagen composition of claim 13 wherein said collagen composition contains from about 5% to about 30% by weight of the dry solids content thereof of non-collagenous fibers.

15. A collagenous tubular food casing having uniformly incorporated therein from about 3% to about 19% by weight of all the components of said casing of an antiblock additive selected from the group consisting of fully esterified fatty acid esters of polyhydric alcohols, mineral oil, and mixtures of the same.

16. The tubular casing of claim 15 having uniformly incorporated therein from about 3% to about 19% by weight of all the components of said casing of non-collagenous fibers.

17. The tubular casing of claim 15 having uniformly incorporated therein from about 6% to about 15% by weight of said antiblock additive.

18. The tubular casing of claim 15 wherein said antiblock additive is a fully esterified fatty acid ester of a polyhydric alcohol.

19. The tubular casing of claim 15 wherein said antiblock additive is mineral oil.

* * * * *